United States Patent

Takegawa

[11] Patent Number: 5,875,161
[45] Date of Patent: Feb. 23, 1999

[54] METHOD AND APPARATUS FOR ACCESSING TRACK ON AN OPTICAL DISC

[75] Inventor: Syozo Takegawa, Daito, Japan

[73] Assignee: Funai Electric Co., Ltd., Osaka, Japan

[21] Appl. No.: 763,014

[22] Filed: Dec. 11, 1996

Related U.S. Application Data

[63] Continuation-in-part of Ser. No. 392,395, Feb. 22, 1995, abandoned, which is a continuation of Ser. No. 47,845, Apr. 15, 1993, abandoned.

[30] Foreign Application Priority Data

Apr. 16, 1992 [JP] Japan ................................. 4-124272
Apr. 16, 1992 [JP] Japan ................................. 4-124273

[51] Int. Cl.⁶ .................................................... G11B 7/00
[52] U.S. Cl. ........................................ 369/44.28; 369/32
[58] Field of Search ................................. 369/44.28, 32; 360/78.05, 78.14

[56] References Cited

U.S. PATENT DOCUMENTS

| | | | |
|---|---|---|---|
| 4,774,699 | 9/1988 | Giddings | 369/32 |
| 5,163,033 | 11/1992 | Yanagi | 369/32 |
| 5,182,736 | 1/1993 | Yanagi | 309/44.28 |
| 5,216,647 | 6/1993 | Kitani | 369/44.28 |
| 5,222,054 | 6/1993 | Muraoka et al. | 369/44.28 |
| 5,428,590 | 6/1995 | Ogino | 369/44.28 |

Primary Examiner—Thang V. Tran
Attorney, Agent, or Firm—Lackenbach Siegel Marzullo Aronson & Greenspan, P.C.

[57] ABSTRACT

A method for accessing track on an optical disc, comprising steps of implementing a preliminary track jump by a light pickup of a certain number of tracks from a present block on the optical disc; reading track information of the track to which the light pickup is jumped by the initial step; calculating an actual linear velocity of the optical disc on the basis of the track information obtained in the reading step; and then calculating a correcting coefficient by using the actual linear velocity obtained by the first calculating step; and establishing for the light pickup a number of corrected tracks to be jumped up to a destination block by using the correcting coefficient obtained in the second calculating step; wherein a track jump of light pickup is performed according to the number of corrected tracks established in the last step. The invention also comprises an apparatus for accessing rack on an optical disc, comprising a preliminary track jump for jumping a light pickup till a certain number of tracks from a present block on the optical disc; a reading device for reading track information of the track to which the light pickup is preliminarily jumped; a first calculation device for calculating an actual linear velocity of the optical disc on the basis of the track information; a second calculation device for calculating a correcting coefficient by using the actual linear velocity; an establishing device for establishing for the light pickup a number of corrected tracks to be jumped up to a destination block by using the correcting coefficient; and a jumping device for jumping the light pickup according to the number of corrected tracks

3 Claims, 7 Drawing Sheets

METHOD AND APPARATUS FOR ACCESSING TRACK ON AN OPTICAL DISC

RELATED PATENT APPLICATION(S)

This application is a Continuation-in-Part of my U.S. patent application, Ser. No. 08/392,395, filed Feb. 22, 1995, now abandoned which is a continuation of U.S. Ser. No. 08/047,845, filed Apr. 15, 1993 (now abandoned).

BACKGROUND OF THE INVENTION

This invention relates to a track access method of a disc for accessing a track of an objective or destination block at high speed in an optical disc or a magneto-optical disc.

Present track accessing methods of discs generally calculate the number of tracks from the present block to the objective block and perform track jumping by a tracking means to the calculated number of tracks.

However, in such conventional track accessing methods, since the track jump has been performed with the number of tracks to the objective block as it is, considerable time is required to amend the track jump so that it is within 1 track before the objective block. Accordingly, the number of times of track jumping increases by 1 or 2 until the access is completed. This causes the problem of "a prolongation of access time."

For instance, with compact discs, the linear velocity of the track is different, such as 1.2 to 1.4 m/s, according to the disc. Accordingly, up to the present, errors occurred in the number of tracks to the objective block calculated as a constant linear velocity (e.g., 1.3 m/s). As a result of this error, the increase in the number of times of track jumping was unavoidable and the access time to the objective track was prolonged.

This invention is performed in view of the above conventional problem points, and its objective is to provide a track access method of discs which is able to access the track of the objective block at a high velocity by decreasing the number of track jumping times.

BRIEF DESCRIPTION OF THE INVENTION

The track access method of the disc in this invention consists of, in the track access method of the disc which performs a track jump of a light pickup from the present block to the objective block, an arithmetic system for the number of the track which calculates the number of tracks from the present block to the objective block, a block comparing means which judges whether or not the objective block is larger than the present block, a reduction means which deducts 1 from the calculated result of the number of tracks when the objective block is larger than the present block based upon the compared result of said block comparing means, and an adding means which adds 1 to the calculated result of said arithmetic system of the number of the tracks when said objective block is smaller than the present block, whereby the light pickup is allowed to jump up by the number of tracks obtained by said reduction means or adding means.

Further, the access method of the disc which performs the track jump of the light pickup from the present block to the objective block consists of:

a first track jump means which performs a track jump of the light pickup from the present block near to the objective block;

a linear velocity calculating means which calculates the linear velocity of the track from the track information of the disc after the completion of the track jump due to the first track jump means;

a correction means for the number of the tracks which corrects said number of jumped tracks based upon the linear velocity obtained by said linear velocity calculation means; and a second track jump means which performs the re-track jump of the light pickup by the number of tracks obtained by said number of correction means.

The track access velocity is accelerated by the fact that the light pickup is allowed to track jump within one track before the objective block by reducing or adding one track with respect to the calculated number of tracks according to the size of the objective block against the present block.

Also, the track access is accelerated by the fact that the number of tracks obtained by the initial track jump step is corrected by the linear velocity information at the time of the track jump, thereby performing the track jump by the number of tracks.

DETAILED DESCRIPTION OF THIS INVENTION

Figure 2:
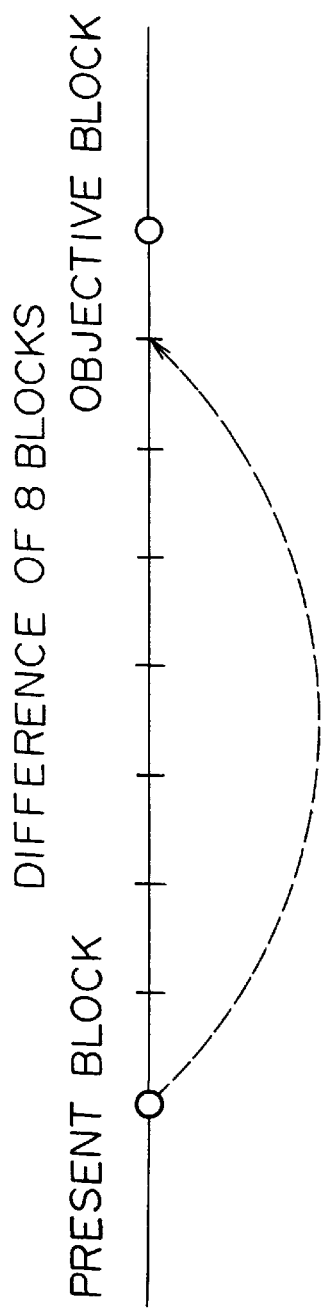
FIG. 2 is an explanatory view which concretely shows a track access method (present block<the objective block) of this invention.

FIG. 2 is a block view which shows a summary construction of a CD-ROM which adopts a track search control unit for practicing an embodiment of this invention. In this case, a unit having an acoustic digital signal processing means and a CD-ROM digital signal processing means is described as an example.

The CD-ROM drive circuit (hereafter called "drive") 1 is provided with a disc holder 3 having a disc 2, a spindle motor 4 for driving the disc 2, a light pickup 5 for reading information from the disc 2, an acoustic digital signal processing means 6, a CD-ROM digital signal processing means 7, a servo control portion 8 for controlling focusing and tracking of the light pickup 5, a system control means 9 having a microcomputer, and an interface 11 for communication with a host computer 10.

A plurality of tracks are formed in the disc 2. The spindle motor 4 rotates the disc 2 at a constant linear velocity by a control signal from the acoustic digital signal processing means 6. The light pickup 5 irradiates a spotlight to the disc 2 and receives a reflection light therefrom, thereby reading information. This light pickup 5 can be transferred in the diameter direction of the disc 2. This light pickup 5 is provided with an object glass 27. The object glass 27 is provided to converge the spotlight of the light pickup 5, and is able to move in the diameter direction of the disc 2, and in a contact or separate direction to or from the disc 2. By these movements, the tracking control or the focus control are performed, whereby the spotlight always pursues the track to be converged as a spotlight having a certain diameter. This control means 8 performs a thread servo control when the light pickup 5 moves in a diameter direction.

The acoustic digital signal processing means 6 is provided with a EFM demodulation means 12 where a signal from the light pickup 3 is input therein, a RAM 13 which memorizes data, an address control means 14 for controlling reading and writing of data to the RAM 13, an error correcting means 15 which corrects data error by an error correcting code (CIRC), and a velocity control means 16 which controls the velocity of the spindle motor 4. The EFM demodulation means 12 demodulates data recorded in the disc 2 to an original 8-bit data by modulating an 8-bit data to 14-bit. The velocity control means 16 outputs a drive signal for controlling the velocity of the spindle motor 4 by the track information read. At the time of normal regeneration, the rotation of the spindle motor 4 is controlled so that the linear velocity of the disc 2 may be constant, while the velocity of the spindle motor 4 is adjusted so as to agree with the number of revolutions of the objective track. Further, the address-controlling means 14 performs an operation which returns interleaved and recorded data to the original order (de interleave) by data in the RAM 13. The output of an error correcting means 10 is output toward the outside as audio signal and input to the CD-ROM digital signal processing means 7.

The CD-ROM digital signal processing means 7 is provided with a synchronous detecting means 17, a RAM 18 for accommodating data, RAM controlling means 19 for controlling the reading and writing of data to the RAM 18, and an error-correcting means 20 where errors are corrected by ECC (Error Check Code) and EDC (Error Detecting Code) and the like which are unique to the CD-ROM. The synchronous detecting means 17 detects synchronous data means among the data treated by the acoustic digital signal processing means 6. In this synchronous detecting means 17, a scramble treatment carried out at the time of recording is adapted to release by the detected result of the above synchronous data. In the RAM control means 19, a header address in the generated data is checked by the accommodated data in the RAM 18.

Figure 5:
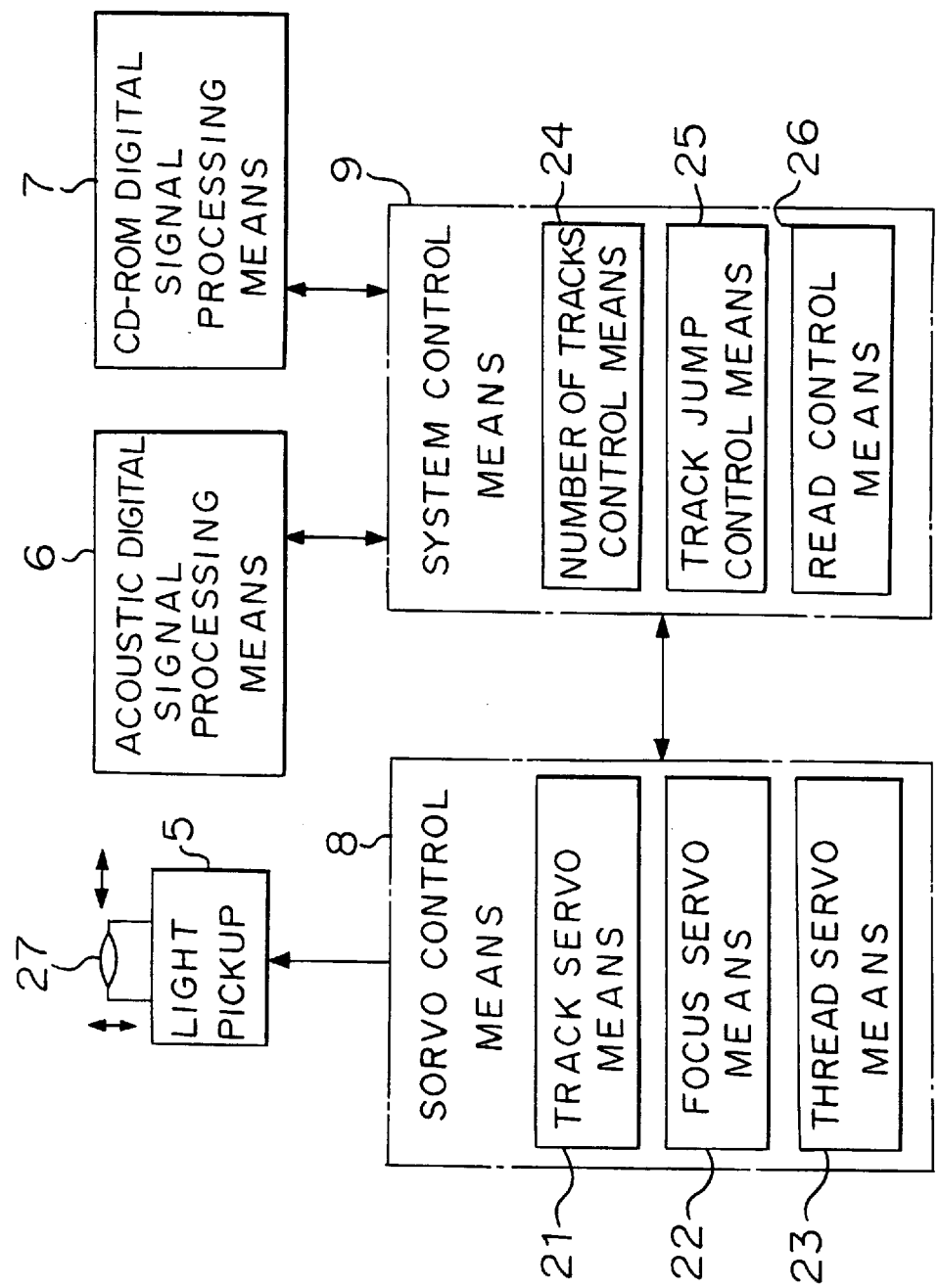
FIG. 5 is a functional block view of a servo control means in FIG. 4.

FIG. 5 is a block view which shows a functional structure of the servo control means 8 and the system control means 9. The servo control means 8 is provided with a track servo means 21 which permits the object lens to track jump, a focus servo means 22 which performs the focus control of the object lens 27, and a tread servo means 23 which performs the servo control of the light pickup 5 in a diameter direction of the disc 2.

The system control means 9 is provided with a track calculation means 24 which calculates the number of tracks from track information which informs the present position of the light pickup and the information of the objective track to move, a track jump control means 25 which indicates the track jump to the track servo part 21, and a reading control means 26 which instructs the reading of the track information to the light pickup 5.

Figure 6:
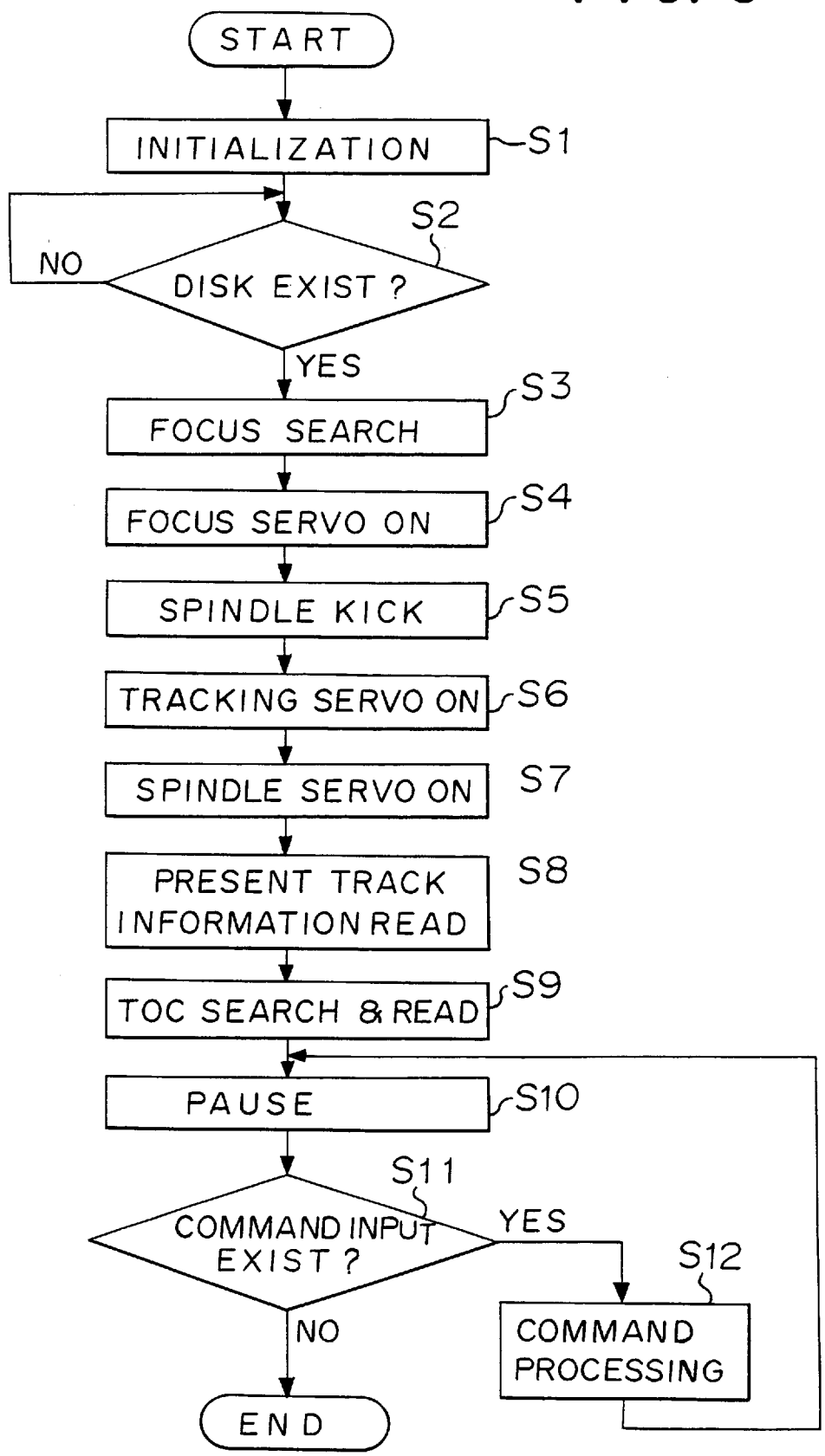
FIG. 6 is a flow chart view which shows a summary operation of the system control means in FIG. 4.

The control operation of the drive 1 thus constructed will be described as follows. FIG. 6 is a flow chart which shows the outline of the control in the system control means 9.

When the power switch (not shown) is on, initialization of the RAM 13 and RAM 18 and initialization of setting the light pickup 5 to an initial position are performed in step S1. Then, in step S2, it is judged whether or not the disc 2 is equipped to the disc holder 3. When the disc is equipped, it moves to step S3. In step S3, a focus search is instructed to the servo control means 8. By this, the spotlight irradiated to the disc 2 from the light pickup 5 is converged to a certain diameter. When the focus servo is finished, the step moves to step S4 and the initialization of the focus servo is instructed to the servo control means 8. The focus servo serves to move the object lens 27 of the light pickup 5 upward and downward following the surface shaking of the disc 2.

In step S5, a spindle kick is instructed to the velocity control means 16. By this, a drive signal is given to the spindle motor 4, thereby initiating the spindle. In step S6, the servo control means 8 is instructed to turn on the tracking servo. This tracking servo permits the object lens 27 of the light pickup 5 to move in a diameter direction so that the spotlight may follow the track. In step S7, the velocity control means 16 is instructed to turn on the spindle servo. The spindle servo performs the servo control of the spindle motor 4 at a velocity in accordance with the position in a diameter direction so as to make the linear speed of the disc 2 constant.

When the spindle servo is initiated in step S7, the step advances to step S8. In step S8, the present track information written at the head of each block in disc 2 is read, and in step S9, information corresponding to a table of contents in the disc 2, the so-called "TOC", written in the most inner circumference of the disc 2 is read by search, and is stored in the memory in the system control means 9.

Figure 1:
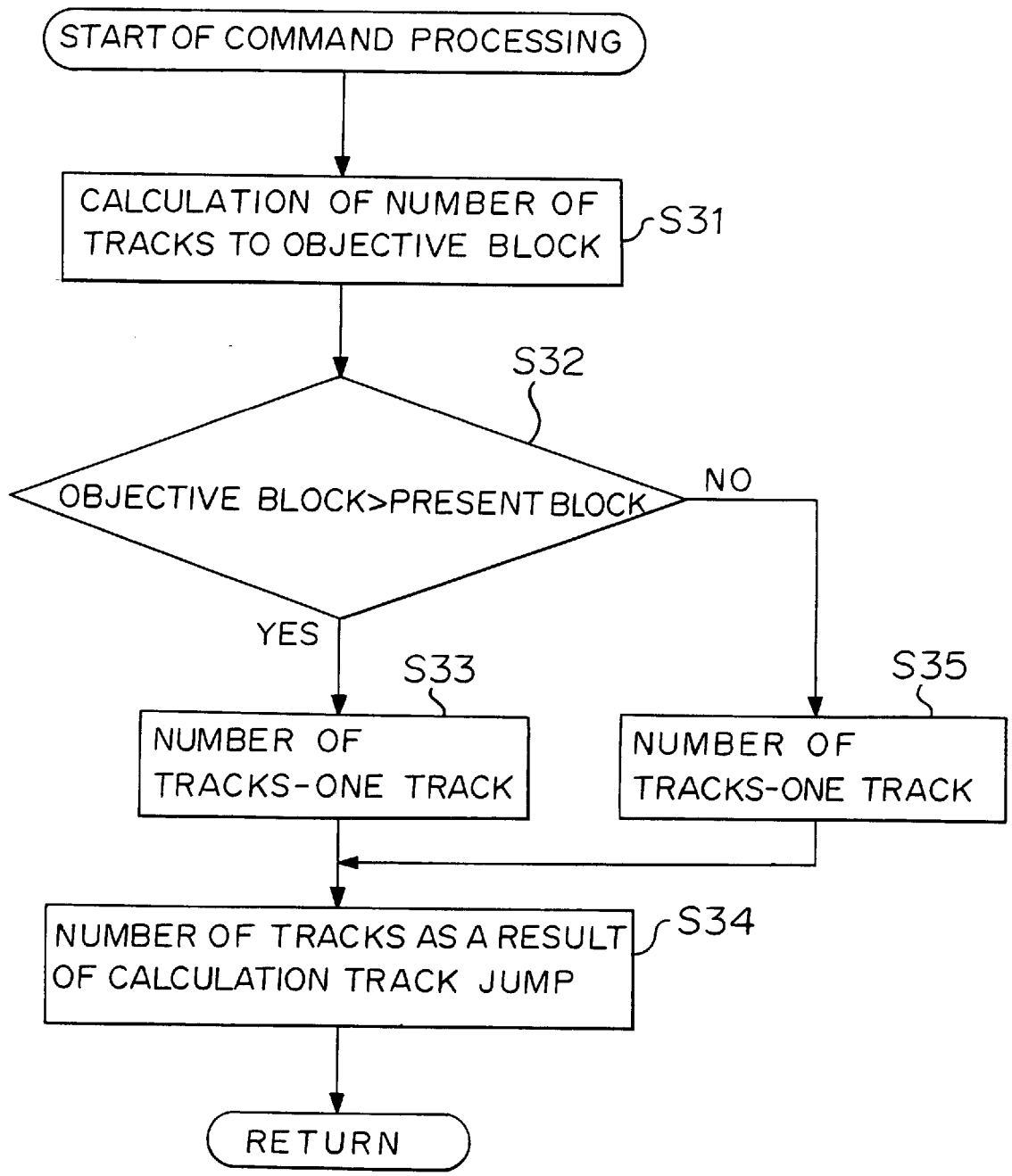
FIG. 1 is a flow chart which shows an embodiment according to a method of this invention.

Then, in step S10, a pause is performed and in step S11, a command input from the host computer 10 is paused. When the command is input form the host computer, the step moves from step S11 to step 12. In step S12, many types of command processings are performed, as shown in FIG. 1, and return to step S10. When there is no command input in step S11, the processing is finished.

Next will be described, according to the flow chart in FIG. 1, the practice order of the track access method according to this invention by using a CD-ROM which adopts the track search control unit of the track constructed as above. The flow chart in FIG. 1 is performed as one of the commands in the command-processing step S12 of FIG. 6.

First, in step S31, the calculation portion of the number of tracks 24 calculates the number of tracks up to the objective block by receiving the input signal of the track access.

Then, whether or not the present block is smaller with respect to the objective block is judged in step S32. If it is smaller, one track is deducted from the number of the above tracks at S32, and this number of tracks is calculated at the above calculation means of the number of tracks 24. Then, the tracks thus reduced are subjected to a track jump at the track jump control means 25 as a jump track to jump within 1 track of the objective tracks.

On the other hand, against this, when the present block is judged not to be smaller than the objective block in step S32, the number of tracks plus 1 track added to the above number of tracks is required at the calculation means of the number of tracks 24 at step S35. Thus, the tracks required by this addition in step S34 are subjected to the track jump action at the track jump control means 25 as a jump track to be jumped within 1 track before the objective track.

The above action will be described concretely as follows:

In relation, the present block<objective block, for instance, when there exists a difference of 8 tracks as shown in FIG. 2, the light pickup can jump to within 1 track before the objective track with a single jump by jumping (8−1=7) tracks.

Figure 3:
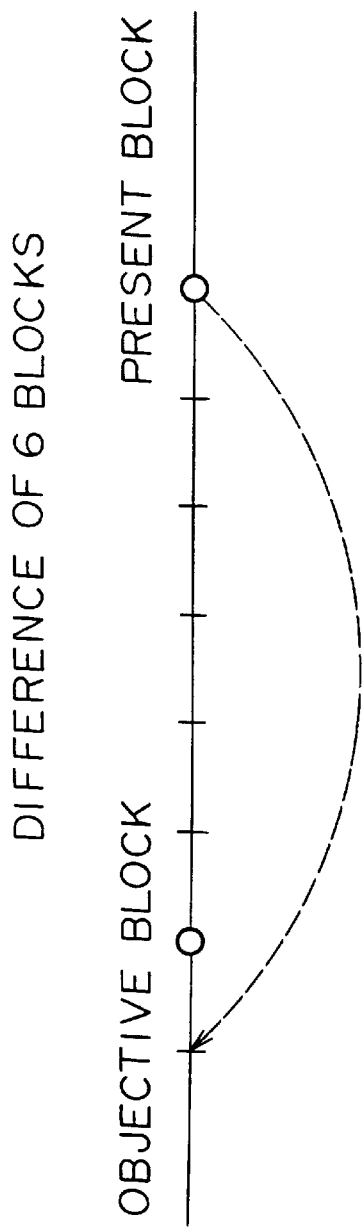
FIG. 3 is an explanatory view which concretely explains a track access method (present block>objective block) of this invention.
Figure 4:
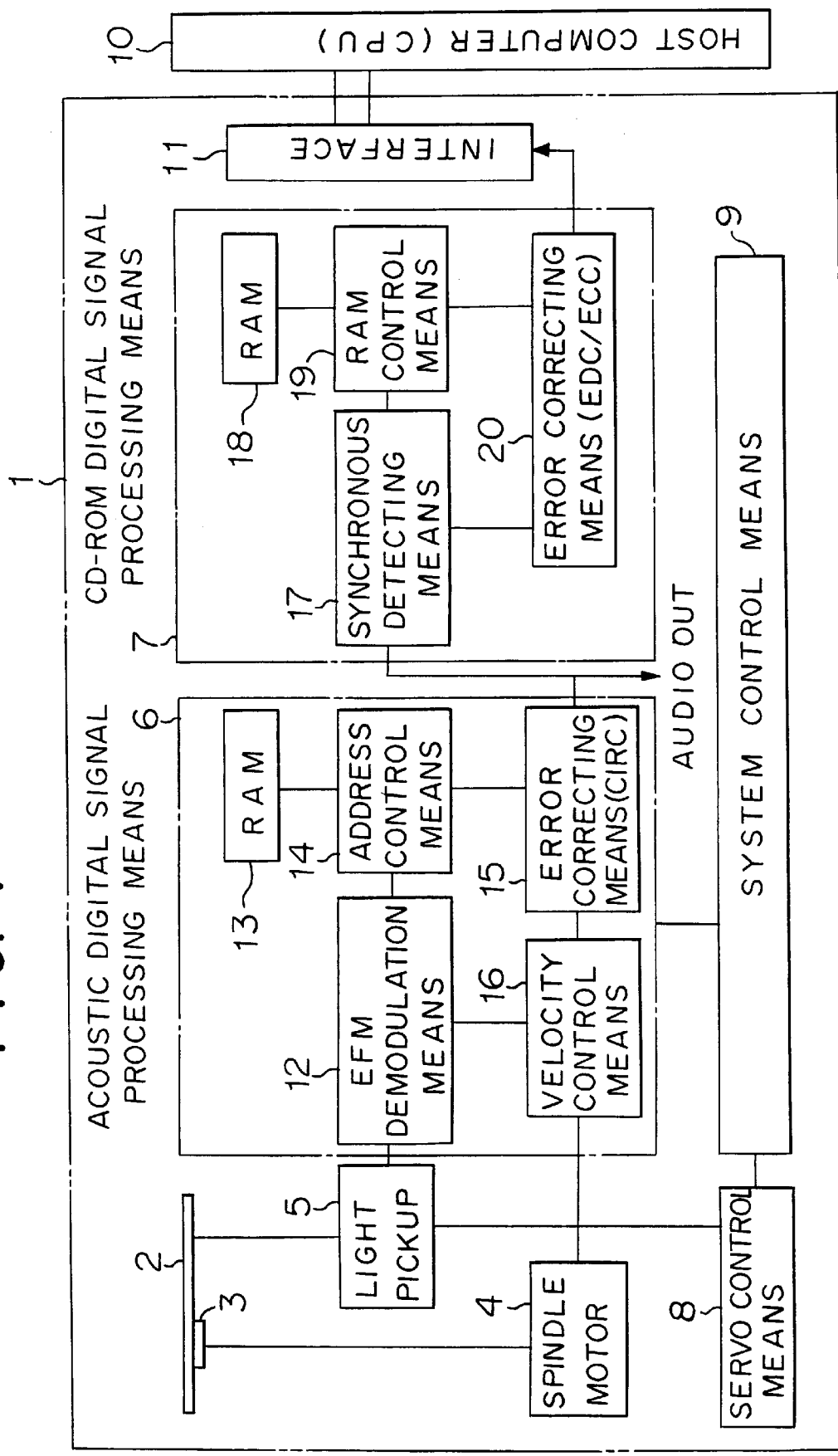
FIG. 4 is a block view which shows the construction of a CD-ROM drive wherein a track search control unit for practicing an embodiment of this invention is in use.

On the other hand, when the present block>objective block, if there is a difference of 6 tracks as shown in FIG. 3, the light pickup can jump to within 1 track before the objective track with one jump by jumping 6+1=7 tracks. In other words, the access time becomes rapid.

As described above, it is possible to shorten the access time together with cancelling the correcting time by jumping, without fail, within one track before the objective block.

Another embodiment of this invention will be described according to FIG. 7.

Figure 7:
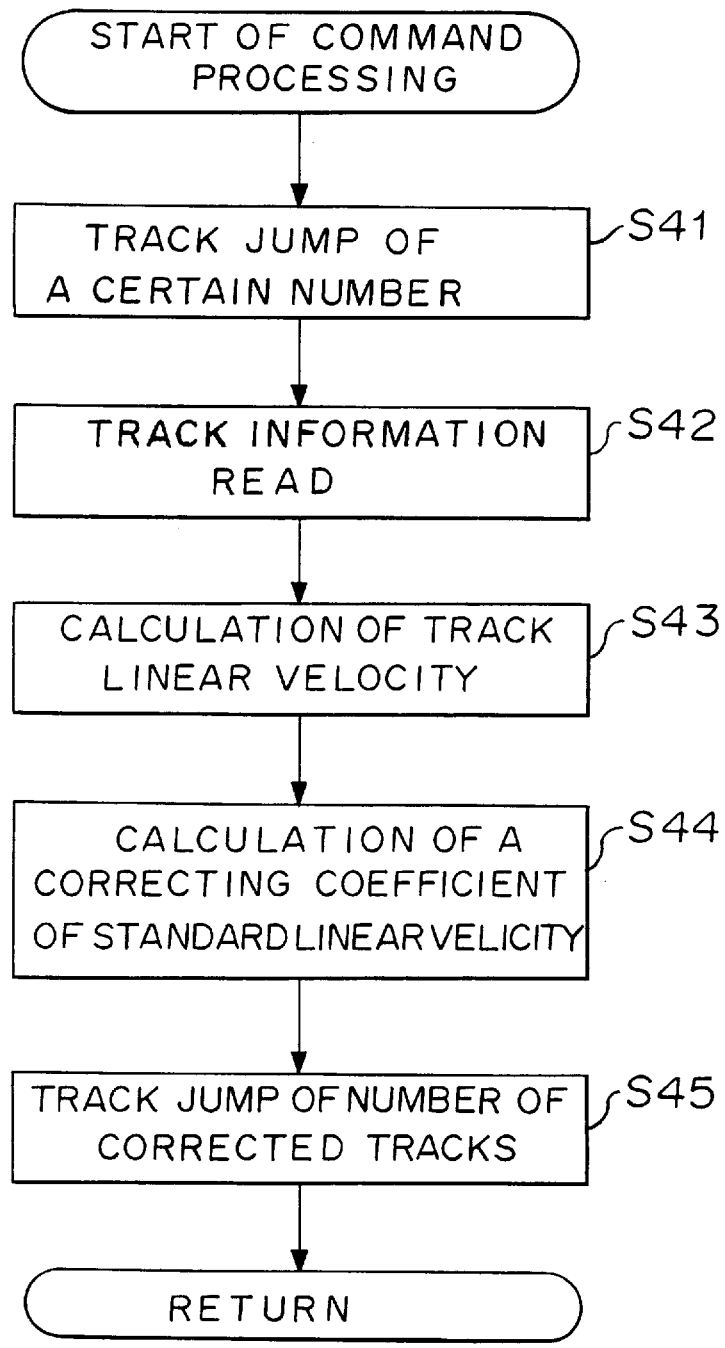
FIG. 7 is a flow chart which shows another embodiment of this invention.

A flow chart in FIG. 7 is performed as one command of the command processing step S12 in FIG. 6.

First, in step S41, the number of tracks having a certain number (e.g., 1000) is decided, and the track jump control means 25 performs a track jump from the present block to the objective track.

In step S42, the tracks reached by the above track jump are read the track information at the read control means 26.

In step S43, the linear velocity of the track to perform a track jump is calculated from the above-read track information. The disc is provided with a plurality of recorded tracks (bit) having a circle form or a helical form, and since a scale such a 0 minutes 0 seconds 0 block when the standard velocity is 1.3 m/sec (block is a 75 rotation) is graduated, the linear velocity of the objective track can be understood by taking a standard of linear velocity 1.3 m/s, for instance, from the scale when 1000 tracks are moved from 0 minutes 2 seconds 0 block.

In step S44, the number of tracks for track jumping having the corrected number of tracks thereof is obtained accurately by performing a track calculation with the calculation means of the tracks 24 using the deviation between the linear velocity and the standard linear velocity thus obtained above as a correction efficient.

Figure 8:
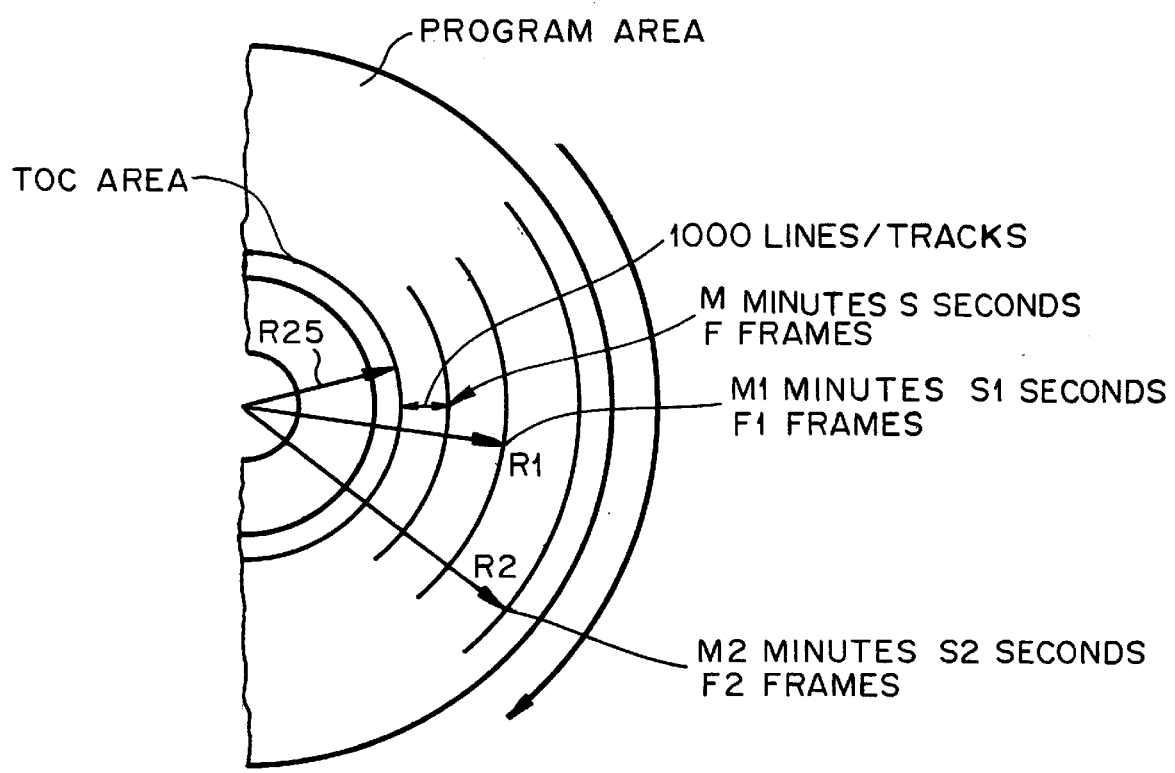
FIG. 8 is a partial, diagrammatic illustration of an optical disc/CD showing track lines and associated identifying nomenclature for a better understanding and facilitating how the actual linear velocity of the recording medium and the correction coefficient are calculated.

With reference to FIG. 8, the absolute time code, i.e., the Q code recorded on the CD is "00 minutes 00 seconds 00 frames" at a position from which the program area is started, i.e. at a position of the diameter equal to 25 mm, and the Q code is succeedingly increased toward the outer periphery of the CD, on the assumption that the Q code at a track jumped by 1000 tracks from the program starting position (R=25 mm: "00 minutes 00 seconds 00 frames") is "M minutes S seconds F frames", the following equation (1) can be established.

$$\pi \times (25 + 1000 \times 1.6 \times 10^{-3})^2 - \pi \times 25^2 = 1.6 \times 10^{-3} \times V \times 10^3 \times (M \times 60 + S + F/75)$$

By changing the above described equation (1), the linear velocity V can be evaluated by the following equation (2).

$$V = \frac{\pi \times (25 + 1000 \times 1.6 \times 10^{-3})^2 - \pi \times 25^2}{1.6 \times 10^{-3} \times 10^3 \times (M \times 60 + S + F/75)}$$

According to the above described equation (2), in different linear velocities, the Q codes at the track jumped by 1000 tracks from the program staring position becomes and is tabulated as follows:

"2 minutes 15 seconds 6 frames" at V=1.2
"2 minutes 9 seconds 51 frames" at V=1.25
"2 minutes 4 seconds 52 frames" at V=1.3
"2 minutes 0 seconds 5 frames" at V=1.35
"1 minute 55 seconds 59 frames" at V=1.4

Therefore, in regarding the Q code at the linear velocity is 1.3 meter/second as a reference linear velocity, it is possible to evaluate the actual linear velocity by determining the time deviation between the reference Q code and the Q code read at that time.

On the other hand, on a disc, a radius R1 at a Q code of "M1 minute S1 seconds F1 frames" at the linear velocity V can be given by the following equation (3).

$$R1 = \sqrt{\frac{(M1 \times 60 + S1 + F1) \times V \times 10^3 \times 1.6 \times 10^{-3} + \pi \times 25^2}{\pi}}$$

As similar to the above, on the disc, a radius R2 at a Q code of "M2 minutes S2 seconds F2 frames" at the linear velocity V can be given by the following equation (4).

$$R2 = \sqrt{\frac{(M2 \times 60 + S2 + F2) \times V \times 10^3 \times 1.6 \times 10^{-3} + \pi \times 25^2}{\pi}}$$

Therefore, the number of the tracks between the two Q codes, that is, between "M1 minutes S1 seconds F1 frames" and "M2 minutes S2 seconds F2 frames" can be evaluated according to the following equation (5).

$$\text{The number of the tracks} = \frac{|R2 - R1|}{1.6 \times 10^{-3}}$$

On the other hand, a correction coefficient K is computed by the following equation (6), and a constant L is computed by the following equation (7).

$$K = \frac{V \times 10^3}{1.6 \times 10^{-3} \times \pi}$$

$$L = \frac{25^2}{1.6^2 \times 10^{-5}}$$

In accordance with the correction coefficient K, the number of the tracks to be actually jumped can be calculated by the following equation (8).

$$\text{The number of the tracks} = |\sqrt{K \times (M2 \times 60 + S2 + F2) + L} - \sqrt{K \times (M1 \times 60 + S1 + F1) + L}|$$

Therefore, if a table of the correction coefficient K according to parameter of the time deviation of the Q code which is read after 1000 track jump with respect to the Q code at the reference linear velocity is prepared in advance in a ROM of the microcomputer, for example, it is possible to rapidly calculate the number of the tracks to be jumped. In addition, the constant L is used for simplifying the equation (8) only.

Furthermore, it is possible to calculate the number of the tracks to be jumped by using the correction coefficient K without using the table.

In step S45, a final track jump step according to the above calculation is performed with high accuracy. Thus, the number of track jump times is decreased sufficiently compared with the conventional one and access to the objective track can be performed at high velocity.

Thus, the high accuracy and high velocity of the track access can be intended by performing a certain track jump from the present block (e.g., 1000 track from 0 minutes 2 seconds 0 block as the above), calculating the linear velocity of the track from the track information after track jumping and deciding the number of tracks to perform the track jump accurately.

According to the track access method of this invention, the following effects can be obtained:

As the light pickup can come within one track before the objective track with one jump, practical effects such as high velocity track accessing can be obtained.

Also since errors in calculation regarding the number of tracks decrease, the number of track jumps to the objective track can be decreased whereby the access time to the objective track becomes shorter.

What I claim is:

1. An apparatus for accessing a track of a disc which permits the light pickup to track jump from a present block to an objective block which comprises:
    a first track jump means which permits a light pickup to track jump from the present block to near an objective block;
    a linear velocity calculated means which calculates the linear velocity of the disc from track information on the disc after the completion of the track jump due to the first track jump means;
    a correction means of the number of tracks which corrects the number of the above jumped tracks due to the linear velocity obtained by said linear velocity calculation means; and
    a second track jump means which permits the light pickup to track jump again by the number of tracks obtained by the correction means of the number of the above tracks.

2. A method for accessing track on an optical disc, comprising the steps of:
    (a) implementing a preliminary track jump by a light pickup of a certain number of tracks from a present block on said optical disc;
    (b) reading track information of the track to which said light pickup is jumped by said step (a);
    (c) calculating an actual linear velocity of said optical disc on the basis of said track information obtained in said step (b);
    (d) calculating a correcting coefficient by using said actual linear velocity obtained by said step (c); and
    (e) establishing for said light pickup a number of corrected tracks to be jumped up to a destination block by using said correcting coefficient obtained in said step (d); wherein a track jump of said light pickup is performed according to said number of corrected tracks established in step (e).

3. An apparatus for accessing track on an optical disc, comprising:
    a preliminary track jump means for jumping a light pickup till a certain number of tracks from a present block on said optical disc;
    a reading means for reading track information of the track to which said light pickup is preliminarily jumped;
    a first calculation means for calculating an actual linear velocity of said optical disc on the basis of said track information;
    a second calculation means for calculating a correcting coefficient by using said actual linear velocity;
    an establish means for establishing for said light pickup a number of corrected tracks to be jumped up to a destination block by using said correcting coefficient; and
    wherein jumping means for jumping said light pickup is operative according to said number of corrected tracks.

* * * * *